United States Patent Office 3,157,100
Patented Nov. 17, 1964

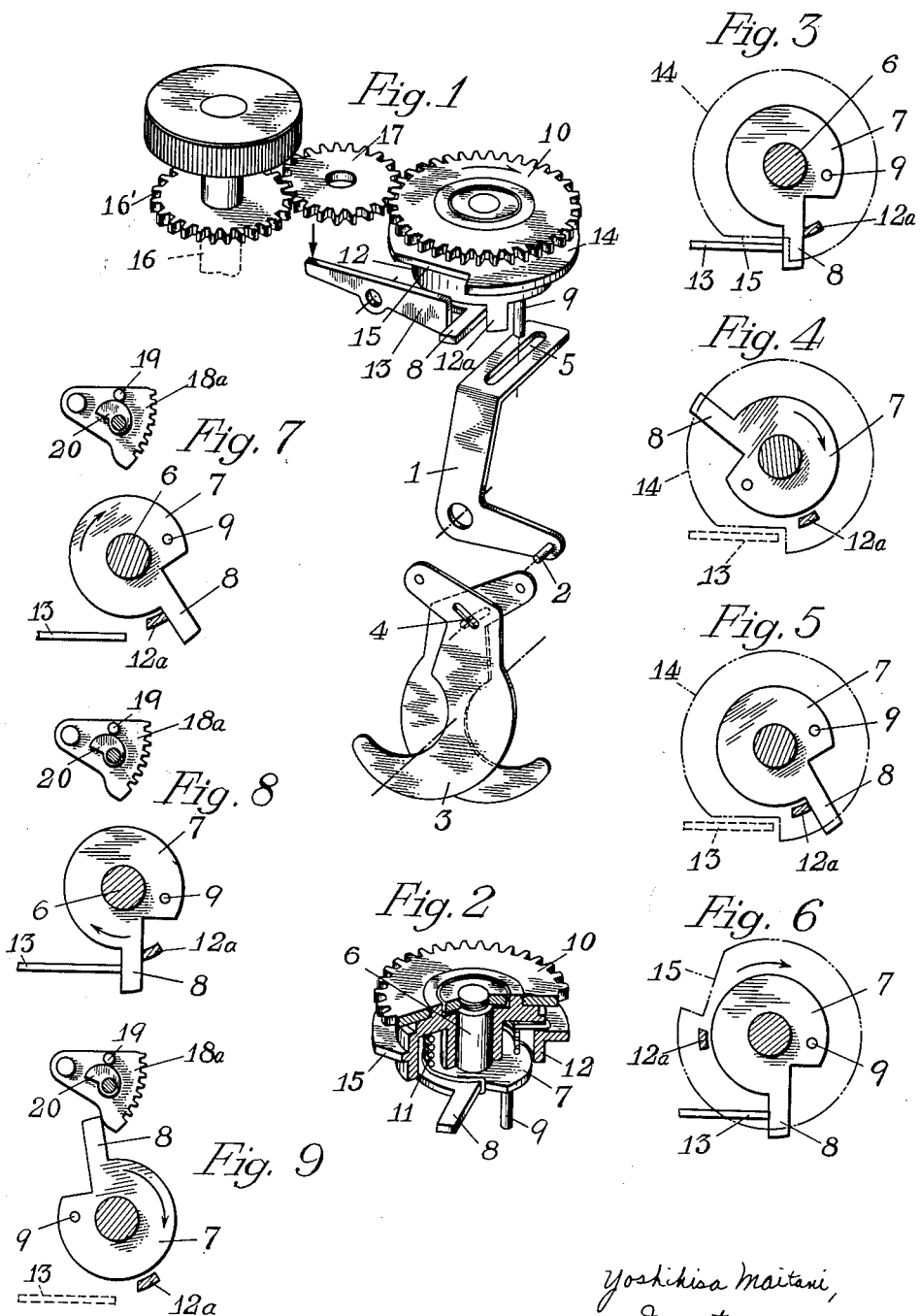

3,157,100
SHUTTER DEVICES FOR PHOTOGRAPHIC CAMERAS
Yoshihisa Maitani, Tokyo, Japan, assignor to Olympus Kogaku Kogyo Kabushiki-Kaisha, Tokyo, Japan, a corporation of Japan
Filed Sept. 21, 1961, Ser. No. 139,651
Claims priority, application Japan, Sept. 21, 1960, 35/39,338, 35/47,958, 35/47,959, 35/47,960; Dec. 21, 1960, 35/63,595
7 Claims. (Cl. 95—31)

This invention relates to a shutter device for a photographic camera and is characterized by a shutter charging mechanism none of the elements of which effects a reciprocal movement.

An object of the invention is to provide an improved shutter device for a photographic camera which is extremely simple in construction and reliable in operation.

Another object of the invention is to provide an improved shutter device for a photographic camera which insures that general conditions desirable in the operation of the photographic camera, for example, automatically halting taking up of a photosensitive film, preventing double exposure, inhibiting shutter during a shutter cocking operation and so on are met.

With these objects in view, the invention is a shutter driving device for a photographic camera having a shutter and a means for taking up film, comprising the combination of a first rotatable member adapted to be rotated by the means for taking up film, a second rotatable member having a lug projecting therefrom and having means thereon adapted to be articulated to the shutter, said first member and said second member being rotatable about a common axis for rotational movement relative to each other, an operating spring member disposed about said common axis and having ends thereof connected to said first and second rotatable members respectively, said first member having a projection thereon projecting into the path along which said lug on said second member is movable during rotation of said second rotatable member, and a rockable element adjacent said first and second rotatable members and rockable from a first position in which it abuts against said lug on said second member to prevent rotational movement of said second member to a position in which it is disengaged from said lug on said second member.

The invention will become more readily apparent from the following detailed description taken in conjunction with the accompanying drawings in which:

FIG. 1 is a schematic exploded perspective view of a shutter device for a photographic camera constructed in accordance with the teachings of the invention;

FIG. 2 is a schematic fragmentary perspective view, partly in section of a shutter charging mechanism according to the invention;

FIGS. 3 to 6 are diagrammatic plan views illustrating various relative positions of the shutter charging mechanism shown in FIG. 2 with respect to a shutter releasing element during their operations; and FIGS. 7 to 9 are diagrammatic plan views illustrating the relationships among the positions of the shutter charging mechanism, the shutter releasing element and a gear for controlling a shutter speed.

The invention will now be described, by way of example, as being applied to the lens type of shutter. However, it is to be understood that the invention can be equally applied to the focal plane type of shutter.

Referring now to FIG. 1 of the drawings, there is schematically illustrated a shutter device for a photographic camera constructed in accordance with the teachings of the invention. The device is illustrated in an exploded view and includes a shutter cocking mechanism, a pair of shutter blades and transmission elements disposed therebetween with all stationary housing portions for carrying the abovementioned components being omitted in order to show the parts more clearly. In FIG. 1 a lever 1 is pivotably mounted on a shaft (not shown) parallel to an optical axis of a photographic lens (not shown) in the front portion of a housing of a photographic camera and includes one arm having thereon a pin 2 which, in turn is loosely inserted into an opening 4 formed by crossing a pair of slots provided in a pair of known sickle-shaped shutter blades 3. The other arm of the lever 1 is bent rearward and a slot 5 is formed therein.

A shaft 6 (see FIG. 2) is vertically supported on the upper portion of the housing and includes a control plate 7 rotatably mounted thereon. The control plate 7 is provided with a radial lug 8 and a pendent pin 9, the latter pin slidably engaging the slot 5 formed in the lever 1. Above the control plate 7 the shaft 6 has rotatably mounted thereon a gear 10 and a double walled cylindrical member 12 fixed to or integral with said gear is rotatable around the shaft 6. Within a space between the two walls of the cylindrical member an operating spring 11 is disposed and has one end secured to the cylindrical member and the other end secured to the control plate 7, as shown in FIG. 2. The center wall of the double-walled cylindrical member 12 has a projection 12a extending downward into the path of the radial lug 8. A shutter releasing element 13 pivotally mounted on the housing has one arm which is normally positioned in the path of the lug 8. The gear 10 meshes with an intermediate gear 17 which in turn meshes with a gear 16' secured to a film take-up shaft 16.

The operation of the device thus far described is as follows:

It is now assumed that, immediately after one frame on a length of photosensitive film (not shown) in a photographic camera has been exposed, the pendant projection 12a substantially integral with the gear 10, the lug projecting from the control plate 7 and the shutter releasing element 13 are in their respective positions as illustrated in FIG. 5. Under these circumstances, it is understood that the shutter blades 3 are in the closed position. These a knob or a lever (not shown) secured to the take-up shaft 16 can be operated from outside the camera to wind up the shaft so as to get ready for the succeeding photograph. This causes the gear 10 to be rotated together with the cylindrical member 12 in the direction of the arrow in FIG. 1. Then the spring 11 is tensioned toward the tensioning direction while the control plate 7 is rotated in the direction of arrow as above described until the lug 8 abuts against the end face of the releasing element 31 whereby the plate 7 is prevented from further movement. Thereafter the spring 11 is further tensioned with the plate 7 remaining stationary (see FIG. 6).

The rotational movement of the control plate 7 serves to displace somewhat the shutter blades toward the opened positions thereof by means of the pendant pin 9 and the lever 1 engaging the same. In this connection it is noted that a small angular displacement of the shutter blades just described is ineffective to form even a very small opening between the blades. In this way, the gear 10 will perform one complete rotation to bring a new frame on the length of film into the desired position. At that time, the pendant projection 12a abuts against the lug 8 at the opposite side as shown in FIG. 3 until the lug 8 is sandwiched between the releasing element 13 and the pendant projection 12a. This completes tensioning of the spring 11 and suppresses the rotational movement of the gear 10. Thus the film take up operation is automatically halted.

Then a shutter releasing button (not shown) can be depressed to bring the now engaged end of the releasing element 13 out of the path of the lug 8. This causes the control plate 7 to be released and rotated in the direction of arrow illustrated in FIG. 4 by the resilient force stored in the spring 11. This rotational movement of the control plate 7 effects the opening and closing operation of the shutter blades through the action of the pendant pin 9 and the lever 1. It is to be understood that the shutter blades 3 are opened during one half of the rotation of the control plate 7 and then closed during the remaining one half rotation of said plate, the said control plate 7 always rotating in the same direction, and that according to this invention the mechanism driven through the gear 10 does not have any mechanical element performing a reciprocal movement. As soon as the pendant projection 12a has reached its original position illustrated in FIG. 5 the rotational movement will terminate due to the resistance of the photosensitive film, the mechanism for taking up the same and other dead loads. Thus any depression of the shutter releasing button is ineffective to cause the releasing element to affect the mechanism for opening and closing the shutter. Further, since the mechanism for taking up the film interlocks with the shutter charger, a double exposure is prevented.

While the embodiment illustrated comprises the pin 9 as an operating element for rotating the lever 1, it is to be understood that instead of the pin the control plate 7 may be provided on a portion of its periphery with a cam surface progressively extending toward the outside and adapted to contact the side of the bent portion of the lever 1.

In a shutter device of the type, as previously described, comprising shutter blades adapted to be opened and closed by first rotating the gear 10 to store mechanical energy in the spring 11 connected to the same and then releasing the releasing element to rotate the control plate 7 in a direction in which the gear 10 is rotated to perform tensioning operation, a shutter releasing button may accidentally be actuated for some reason to release the suppression of the releasing element 13 during the shutter charging stroke or under the condition as illustrated in FIG. 6. This will cause the control plate 7 to be rotated by the resilient force stored in the spring 11 before this release operation has begun whereby the shutter blades will perform an incomplete opening and closing operation. Alternatively there may be a fear that the shutter blades remain open. In the latter case the operation of taking up the film will not be completed. Therefore one frame of the film previously photographed might be partially subjected to undesirable light resulting in waste of the film.

The invention contemplates avoiding the disadvantage just described. To this end, the gear 10 is provided immediately above the releasing element 13 with a preventing plate 14 disposed coaxially and integrally therewith. The preventing plate 14 has formed on its periphery a notch 15 operative to permit the releasing element to rock after the completion of charging operation or in a condition as illustrated in FIG. 3. With the arrangement just described, the notch 15 is in a position staggered with respect to the releasing element 13 during the charging stroke or in a condition as illustrated in FIG. 6 so that any depression of the shutter release button can not cause the releasing element to rock because of the presence of the control plate. Therefore, the control plate 7 can not be released and the shutter blades are not permitted to be opened and closed. This ensures that any accidental exposure which otherwise might take place during the shutter cocking stroke is prevented.

The shutter device of the invention as previously described can be controlled in its exposure time by a mechanism such as that shown in FIGS. 7 to 9. More particularly, any of the conventional trains of gearings for controlling an exposure time can be disposed adjacent the shutter charging mechanism as previously described.

In FIGS. 7 to 9 only a toothed sector 18a which is a first gear in the train of gearings 18 is illustrated. The toothed sector 18a has one side edge adapted to abut against the free end of the lug 8 to be struck by the same during the rotational movement of the control plate 7 (see FIG. 9). The first gear 18a is provided with a pin 19 adapted to normally press against a cam surface on the periphery of a cam 20 by the action of a spring (not shown). The cam 20 is adapted to be operated from outside of the camera housing in order to rotate it.

FIG. 7 illustrates the relative positions of the various components before the shutter cocking operation, FIG. 8 the relative positions thereof immediately after the completion of the cocking operation and FIG. 9 illustrates their relative portions immediately after the completion of the shutter releasing operation. It will be appreciated that the size of the spacing between the end of the lug 8 and the adjacent side edge of the toothed sector 18a serves to control the period of time during which the train of gearing is put in its operated state with the distance predetermined in accordance with the position to which the cam 20 has been previously set.

While the invention has been described in conjunction with certain embodiments thereof it is to be understood that various changes and modifications may be made without departing from the spirit and scope of the invention. For example, the invention is equally applicable to shutter devices of the iris type. Also the invention can be advantageously applied to the focal plane type of shutter. In this case, the opening and closing of the shutter may be caused by either the eccentric pin as previously described or a peripheral cam formed on the control plate 7.

What I claim is:

1. A shutter driving device for a photographic camera having a shutter and a means for taking up film comprising the combination of a first rotatable member adapted to be rotated by the means for taking up film, a second rotatable member having a lug projecting therefrom and having means thereon adapted to be articulated to the shutter, said first member and said second member being rotatable about a common axis for rotational movement relative to each other, an operating spring member disposed about said common axis and having ends thereof connected to said first and second rotatable members respectively, said first member having a projection thereon projecting into the path along which said lug on said second member is movable during rotation of said second rotatable member, and a rockable element adjacent said first and second rotatable members and rockable from a first position in which it abuts against said lug on said second member to prevent rotational movement of said second member to a position in which it is disengaged from said lug on said second member.

2. A shutter driving device as claimed in claim 1 in which said first rotatable member has a preventing plate thereon positioned immediately above said rockable element and in the path of movement of said rockable element, said plate having a notch in the periphery thereof abuttable by said rockable element when it is rocked to the position in which it is disengaged from the lug on said second member, whereby when said notch is positioned above said rockable element at the completion of a film winding operation, the rockable element can be rocked to release said second rotatable member to drive the shutter, and when said notch is not positioned above the rockable element during a film winding operation the rockable element cannot be rocked to release said second rotatable member and the shutter cannot be operated.

3. A shutter driving device for a photographic camera having a shutter and a means for taking up film, comprising the combination of a first rotatable member adapted to be rotated by the means for taking up film, a second rotatable member having a lug projecting therefrom and having means thereon adapted to be articulated to the shutter, said first member and said second member being rotatable about a common axis for rotational movement relative to each other, an operating spring member disposed about said common axis and having ends thereof connected to said first and second rotatable members respectively, said first member having a projection thereon projecting into the path along which said lug on said second member is movable during rotation of said second rotatable member, and a rockable element adjacent said first and second rotatable members and rockable from a first position in which it abuts against said lug on said second member to prevent rotational movement of said second member to a position in which it is disengaged from said lug on said second member, and an exposure time controlling gear train having a first gear with a part thereof positioned in the path of said lug on said second member and adapted to be rotated when it is struck by said lug during the rotational movement of said second member, said first gear having a pin thereon, and a cam positioned adjacent said pin and rotatable so as to move the cam profile against said pin to rotate said first gear to various positions to vary the point at which it is struck by said lug.

4. A shutter driving device for a photographic camera having an objective, a shutter formed of pivoted blades and a means for taking up a film, comprising the combination of a first rotatable member adapted to be rotated by the means for taking up film, a second rotatable member, a pivotally mounted lever having one end adapted to be coupled to the shutter blades and pivotally movable about an axis parallel to the optical axis of the objective of the camera to open and close the shutter blades, said lever having the other end bent parallel to the optical axis, said second rotatable member having lever end engaging means thereon engaged with the bent end of said lever for pivoting said lever, said first and second rotatable members being rotatable about a common axis for rotational movement relative to each other, an operating spring member disposed about said common axis and having ends thereof connected to said first and second rotatable members respectively, said first member having a projection thereon projecting into the path along which said lug on said second member is movable during rotation of said second rotatable member, and a rockable element adjacent said first and second rotatable members and rockable from a first position in which it abuts against said lug on said second member to prevent rotational movement of said second member to a position in which it is disengaged from said lug on said second member.

5. A shutter driving device as claimed in claim 4 in which said lever end engaging means on said second rotatable member is a depending pin, and said bent end of said lever has a slot therein in which said pin is engaged.

6. A shutter driving device as claimed in claim 4 in which said lever end engaging means on said second rotatable member is a cam having the cam profile engaged with the bent end of said lever.

7. A shutter driving device as claimed in claim 4 which includes a shaft on which said second member is rotatably mounted, said second rotatable member having a sleeve rotatably positioned on said shaft and a support member on said sleeve on which said lever end engaging means is positioned, said first rotatable member being a double walled cylindrical member having an inner cylindrical wall rotatably positioned around said sleeve on said second rotatable member and having an outer cylindrical wall spaced from said inner cylindrical wall to define an annular space, and said operating spring member being positioned in said annular space.

References Cited in the file of this patent
UNITED STATES PATENTS

| | | |
|---|---|---|
| 2,345,999 | Babcock | Apr. 4, 1944 |
| 2,418,594 | Morse | Apr. 8, 1947 |
| 2,849,938 | Gebele | Sept. 2, 1958 |
| 2,868,099 | Weiss | Jan. 1, 1959 |
| 2,930,303 | Sago | Mar. 29, 1960 |
| 2,975,689 | Chatani | Mar. 21, 1961 |